United States Patent [19]

Takei et al.

[11] Patent Number: 4,552,467
[45] Date of Patent: Nov. 12, 1985

[54] ROLLING BEARINGS FOR STRUT-TYPE SUSPENSIONS

[75] Inventors: Kenji Takei, Hiratsuka; Yukihiro Akabane, Fujisawa, both of Japan

[73] Assignee: Nippon Seiko Kabushiki Kaisha, Tokyo, Japan

[21] Appl. No.: 630,519

[22] Filed: Jul. 13, 1984

[30] Foreign Application Priority Data

Jul. 15, 1983 [JP] Japan ................ 58-109640[U]

[51] Int. Cl.⁴ .................. F16C 19/10; F16C 33/58
[52] U.S. Cl. .................... 384/615; 280/668; 280/673
[58] Field of Search ........... 280/668, 670, 673, 692, 280/696, 724; 267/8 R, 20 A; 308/219, 230, 233, 235, 184 R

[56] References Cited

U.S. PATENT DOCUMENTS

| | | | |
|---|---|---|---|
| 3,981,549 | 9/1976 | Carullo | 308/235 |
| 4,175,771 | 11/1979 | Muzechuk et al. | 280/696 |
| 4,200,307 | 4/1980 | Szabo | 280/668 |
| 4,248,454 | 2/1981 | Cotter et al. | 280/668 |
| 4,274,655 | 6/1981 | Lederman | 267/8 R X |

Primary Examiner—Stuart S. Levy
Assistant Examiner—David Werner
Attorney, Agent, or Firm—Basile Weintraub Hanlon

[57] ABSTRACT

In a rolling bearing for strut-type suspensions, a rotary bearing race 33 has, at its radially inner part, a cylindrical portion 37 having an outwardly extending flange 38. The radial inner end part 41 of the stationary bearing race 34 of the bearing is disposed at such a position so as to be overlapping with the outwardly extending flange 38. At least one of the above-mentioned members confronts and overlaps the other and includes a member having self-lubricating characteristics.

4 Claims, 3 Drawing Figures

PRIOR ART

ROLLING BEARINGS FOR STRUT-TYPE SUSPENSIONS

BACKGROUND OF THE INVENTION

1. Field of the Invention:

This invention relates to a rolling bearing for a strut-type suspension. More specifically, the present invention concerns a shell-type ball bearing through which a piston rod of a shock absorber of a motor vehicle can be inserted.

2. Prior Art:

Strut-type suspensions for motor vehicles are well known. Typifying such suspensions is that shown in FIG. 3 of the drawing. Generally, prior art strut-type suspensions include a piston rod 10' associated with a shock absorber. The piston rod 10' is inserted through an opening in a rotary bearing race 3' of a ball bearing 2' and the inner face of an upper seat 11' for a coil spring 13'. The seal 11' carries the lower axial end of the rotary race 3'. The rotary race 3' is fixed in position on the shoulder of the piston rod 10'. These two members are fixed tightly to the piston rod 10'.

Ordinarily, according to the prior art the coil spring 13' is disposed between the upper spring seat 11' and a lower seat (not shown) which receives or seats the opposite end of the spring 13'. The lower seat is fixedly attached to an outer cylinder of the shock absorber such that the coil spring 13' encircles the piston rod 10'. A stationary bearing race 4' of the ball bearing 2' is fixed in position to a lower plate 15' of a shock absorbing rubber buffer mount assembly 14'. The buffer mount 14' comprises an integrally formed upper plate 16', the lower plate 15' and a rubber buffer 17' interposed between the upper plate 16' and the lower plate 15'. The buffer 17' is integrally adhered to the two plates 15' and 16' by vulcanizing. The upper plate 16' is attached by a bolt 19' to a mounting plate 18' of the motor vehicle. Usually a dust cover 20' is incorporated into the structure.

When the wheels of a vehicle are turned in a different direction by the steering wheel of the vehicle, the piston rods 10' of the vehicle shock absorbers will also rotate, along with the outer cylinders of the piston rods 10'. Thus, both a radial load and a thrust load, applied to each shock absorber, can be supported by the ball bearing 2' associated therewith.

As explained above, ordinary type bearing perform, both, as a thrust bearing and a radial bearing. However, it is increasingly required to use ball bearings of relatively larger size having larger bearing width in order to obtain a predetermined increased loading capacity. In order to achieve this the stroke length of the shock absorber must be shortened, due to the limited mounting height allowed for the bearing. This decreases the extent of shock absorbing capacity.

Use of a shell-type needle roller bearing having a considerably small bearing width may solve the aforesaid problem to some extent. However, such prior art needle roller bearings result in worse steering performance. This is attributable to the larger torque required by the use of needle roller bearing.

In British Patent Specification No. 1446000 there is disclosed a rolling bearing for suspension struts which can solve many of these problems mentioned above. However, the bearing in the British Patent still cannot avoid mutual metal-to-metal contact in the axial direction, between the stationary bearing race and the rotary bearing race, in the assembly, due to the vibration of the vehicle to which the struts are applied. Hence, there is encountered various wear breakage at the points to contact, together with damage to the rubber buffer mount caused by metal powders formed by the wear breakage. This creates various undesirable effects on the durability of the suspension struts.

The present invention, as will subsequently be described, solves such drawbacks in the prior art strut-type suspension.

OBJECTS OF THE INVENTION

An object of the present invention is to provide a strut-type suspension which can lengthen the stroke of the shock absorber to which the suspension strut is to be applied by reducing the mounting height of the rolling bearing to be incorporated therewith.

Another object of the invention is to provide a bearing for strut-type suspensions which requires less torque and imparts almost no harmful effect on the steering performance of the motor vehicle to which the suspension strut is applied.

A still further object of the invention is to provide rolling bearings for strut bearings which withstand longer service life.

SUMMARY OF THE INVENTION

According to the present invention, a shell-type roller bearing having strut-type suspension comprises, (a) a rotary bearing race, the cylindrical portion of which is formed to have an outwardly extending annular flange, (b) a stationary bearing race, the radially and axially innermost end of which is bent radially inward, so as to be overlapped with the outwardly extending flange of the rotary race, and (c) wherein at least one of the confronting portions of the races is formed from a member having self-lubricating characteristics.

This construction enables a reduction in the mounting height of the bearing. Thus, the stroke of the shock absorber can be much longer, while lowering the bearing torque considerably. Furthermore, this construction can prevent both damage to the bearing due to wear at the bearing races and lowering of its durability caused by undesirable effects to its mounting rubber.

By so configuring the suspension, metal-to-metal contact between the stationary bearing race and the rotary bearing race can be prevented, even if the piston rod of the suspension means is axially moved by any heavy vibration of the vehicle. Thus, any harmful wear on the overlapped portions of the two mating bearing races can be prevented, thereby resulting in no harmful abrasion of the rubber buffer mount due to metal powders formed by wear of the races. This ensures longer service life of the strut-type suspension.

For a more complete understanding of the present invention reference is made to the following detailed description and accompanying drawing. In the drawing like reference characters refer to like parts throughout the several views, in which:

DETAILED DESCRIPTION OF THE PREFERRED EMBODIMENTS

Figure 1:
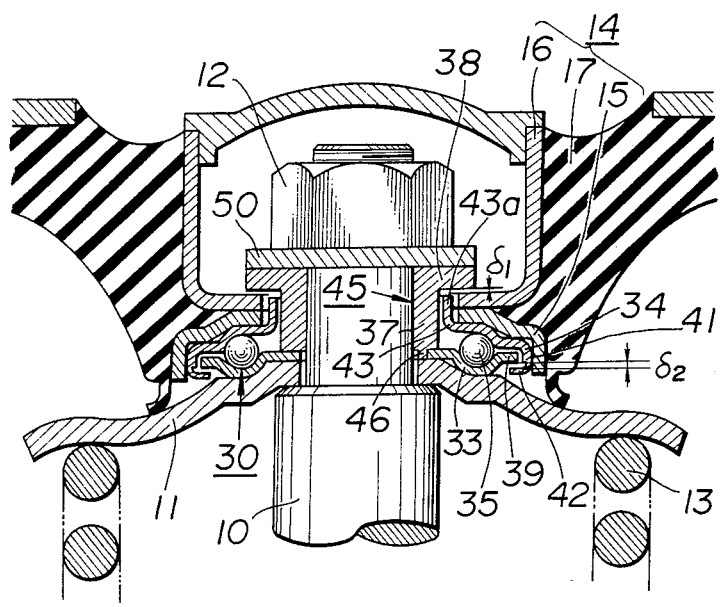
FIG. 1 is a cross-sectional elevation view of a first embodiment of the present invention.

Referring now to the drawing, and in particular, FIG. 1, there is depicted a piston rod 10 incorporated into a shock absorber. According to the present invention a roller bearing 30 is disposed in an overlapping manner on the surface of an upper seat 11 which, also, defines a seat for a coil spring 13.

The bearing 30 is constructed as a shell-type ball bearing, wherein a plurality of bearing balls 35 are accommodated, as rolling members, between a rotary bearing race 33 and a stationary bearing race 34, to provide an angular contact therebetween. Each rotary race 33 and stationary race 34 is fabricated by press forming a thin steel sheet.

On the surface of the rotary bearing race 33 and at the innermost radially peripheral portion thereof a bushing 45, made of a synthetic resinous material, is concentrically affixed. Fixing of the bushing 45 to the radial inner peripheral portion of the rotary bearing race 33 is done by inserting a plurality of protrusions 46, formed at a suitable distance on the axial end of the bushing 45, into respective recesses formed along the radial inner peripheral portion of the rotary bearing race 33. The bushing 45 comprises a cylindrical portion 37 fixed to the rotary bearing race 33 and an integrally formed flange 38, which is formed on the axial top end of the cylindrical portion 37. The flange 38 extends radially outward from the top of the cylindrical portion. Accordingly, the rotary bearing race 33 includes, in turn, at its radial inner side thereof, the cylindrical portion 37 and the flange 38.

The stationary bearing race 34 comprises, at its radial outer margin, a straight cylindrical portion 41, which extends downward from the radial outer margin, and a radial inwardly extending flange 42 contiguously formed by bending the lower part of the cylindrical portion 41 inwardly.

The stationary bearing race 34, also, comprises a cylindrical portion 43a which constitutes a radial innermost portion and an intermediate annular shoulder portion connecting the two cylindrical portions 41 and 43.

The inner surface of the cylindrical portion 43a, formed on the radial innermost part of the stationary bearing race 34, is disposed closely around the outer surface of the cylindrical portion 37 of the rotary bearing race 33.

The outwardly extending flange 38 of the rotary bearing race 33, formed at the axial end of the cylindrical portion 37, is disposed above the axial upper part of the radial innermost portion of the shoulder portion 43, namely, above the axial top end of the cylindrical portion 43a of the stationary bearing race 34, such that the two members can be disposed in overlapping relation.

In addition, at the position axially under the radial outer part 39 of the rotary bearing race 33, the inwardly directed flange 42, formed at the lower end of the cylindrical portion 41 at the radial outer end of the stationary bearing race 34, is positioned so that these two members lie in an overlapping relationship.

In an assembled state, where a pre-determined number of bearing balls 35 are accommodated between the two mating bearing races 33 and 34, the axial clearance $\delta_1$ between the outwardly extending flange 38 and an upper plate 16 is smaller than the clearance $\delta_2$ that is formed between the inwardly extending flange 42, at the end of the cylindrical portion of the stationary bearing race 34, and the radially outer end portion 39 of the rotary bearing race 33.

The rolling bearing of FIG. 1 is assembled, first, by inserting the piston rod 10 into an opening formed in the cylindrical portion 37 of the rotary bearing race 33. Next, the assembled member is, concentrically laid upon the spring seat 11, which is fixed in position on the shoulder of the piston rod 10 and, then, by fastening, through a washer 50, a nut 12 by tightening it along the screw threads formed on the piston rod 10.

Since the rolling bearing of this embodiment is a shell-type one wherein, both, the rotary bearing race 33 and the stationary bearing race 34 are fabricated of a steel sheet of thin thickness, it can afford not only a reduced height for mounting, but, also, angular contact between the balls 35, the rotary race 33 and the stationary race 34. This ensures support for both a thrust load and a radial load. Yet, the torque for a required load capacity can be maintained the same as that obtainable from the ordinary type of ball bearing.

In the rolling bearing 30, both the rotary race 33 and the stationary race 34 have respective cylindrical portions 37 and 41. The cylindrical portion 37 has an radially outwardly extending flange 38 at its upper axial end. The cylindrical portion 41 has a radially inwardly extending flange 42 at its lower axial end which lies under the radially outer part 39 of the rotary bearing race 33 and the radially inwardly extending flange 42 of the stationary bearing race define the bearing 30 as a non-separable type bearing. The radial inner end face of the cylindrical portion 43a is positioned adjacent to the outer face of the cylindrical portion 37 of the rotary bearing race 33. In addition, the clearance $\delta_1$ formed between the end flange 38 of the rotary bearing race 33 and the upper plate 16 and the clearance $\delta_2$ defined between the inwardly directed flange 42 of the cylindrical portion 41 of the stationary bearing race 34 and the radial outer end portion 39 of the rotary bearing race 33, are set to satisfy the relationship $\delta_1 < \delta_2$.

By virtue of this construction, even when the body of the vehicle is raised upward by a jack or other means, away from the ground level, the outwardly extending flange 38 of the cylindrical portion 37 of the rotary bearing race 33 of the bearing 30 is kept in contact with the upper face of the upper plate 16. In this manner the flange 42, extending inwardly from the axial end of the cylindrical portion 41 of the stationary bearing race 34, will never be deformed under any undesirable load. Furthermore, any radial movement of the rotary bearing race 33, due to oscillation of the shock absorber, will urge the outer surface of the cylindrical portion 37 of the rotary bearing race 33 into contact with the cylindrical face at the radial inner end 43 of the stationary bearing race 34 so as to function as a stopper. Accordingly, the rotary bearing race 33 can never be radially moved out of position.

Since the flange 38 formed on the bushing 45 is made of a synthetic resinous material and has self-lubricating property, any mutual contact between the flange 38 and the upper plate 16 is now different from metal-to-metal contact between two mating rigid bodies, such as in the prior art. Any contact rendered herein becomes a contact with reduced abrasion wear and is free from the formation of metal powders.

By utilizing a synthetic resinous bushing 45, not only the step of caulking the peripheral end of the cylindrical portion of the rotary bearing race, but, also, any special heat treatment for preventing work hardening of the caulked portion can be eliminated. This contributes to a simplification of the manufacturing process for making this kind of rolling bearing.

Figure 2:
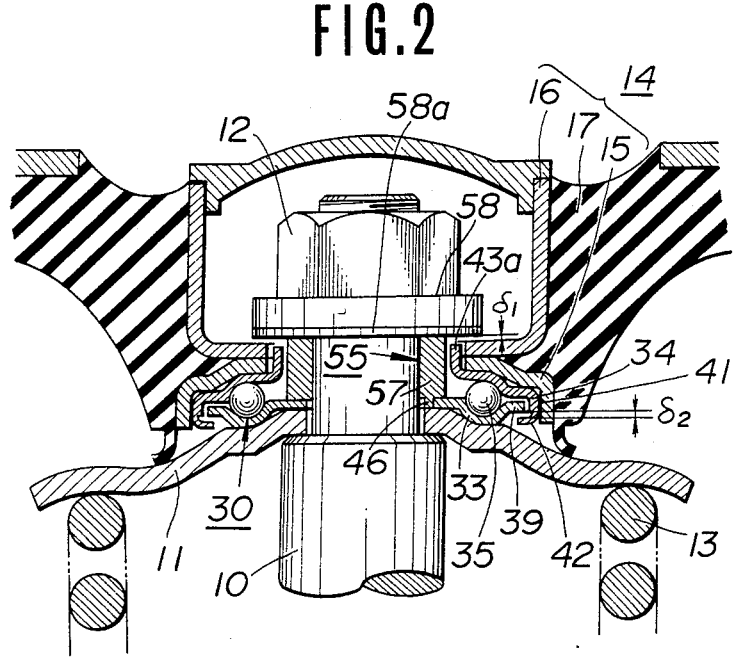
FIG. 2 is a cross-sectional elevational view of an alternate embodiment of the present invention.
Figure 3:
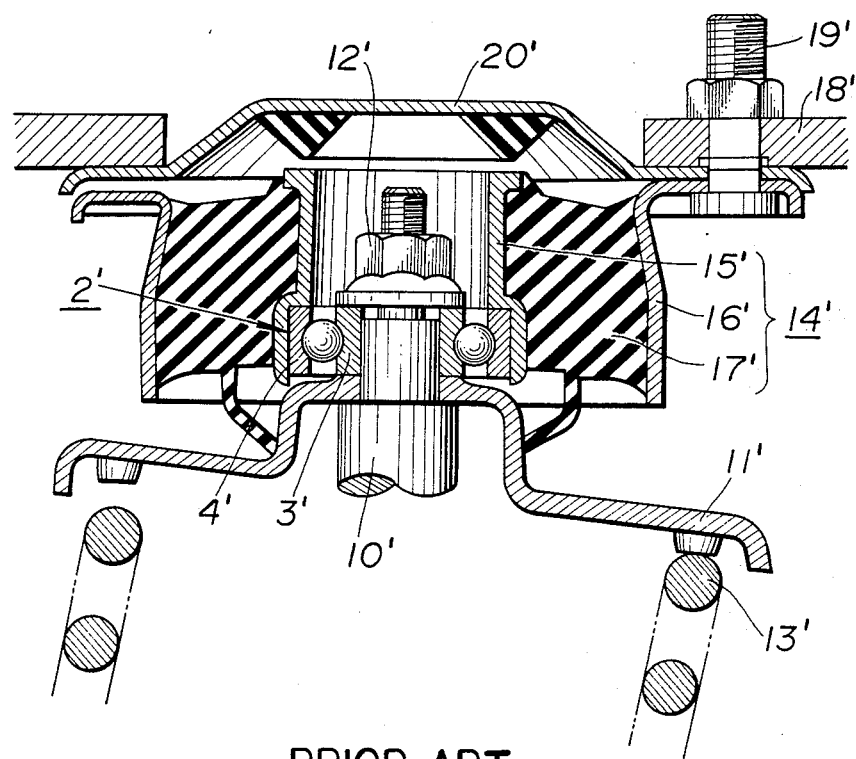
FIG. 3, as noted hereinbefore, is a cross-sectional view of a prior art device.

Referring, now, to FIG. 2 there is depicted an alternate embodiment of the present invention. According to this embodiment, the bushing 55 comprises a cylinder 57 fabricated of a synthetic resinous material and a flange 58 made of an annular steel disc. The lower surface of the flange 58 is backed with either a member 58a having self-lubricating properties, such as a washer made of a synthetic resinous material, or it can be coated or plated with a suitable solid lubricating material, such that it can be confronted with the upper end face of the bushing 55. Preferably, by coating or plating the lower or undersurface there is a reduction in the number or parts to be made and, thus, assembly is simplified.

In all other respects the construction is the same as in the first embodiment.

Having, thus, described the invention, what is claimed is:

1. An angular contact bearing for a vehicle strut-type suspension formed of a shock absorber having an extensible piston rod, a rubber buffer mount attached to the vehicle having an upper plate, and an upper seat for receiving a coil spring, the bearing comprising:

a rotary bearing race fixedly mountable on the piston rod together with the upper seat of the shock absorber for receiving the coil spring;

a first cylindrical portion disposed at the radially inner part of the rotary bearing race, and having a radially outwardly extending flange at one axial end thereof;

a stationary bearing race fixed to the rubber mount, the stationary bearing race having a radially innermost part which confronts the outer face of the first cylindrical portion of the rotary bearing race;

a second cylindrical portion disposed at the radial outer part of the stationary race and having a radially inwardly extending flange disposed at one axial end thereof;

a plurality of bearing balls disposed between the rotary bearing race and the stationary bearing race;

the outwardly extending flange of the rotary bearing race being disposed axially above the upper plate such that the outwardly extending flange and the upper plate overlap each other with a first axial clearance;

the inwardly extending flange of the second cylindrical portion of the stationary bearing race being disposed axially under the radially outer part of the rotary bearing race such that the rotary bearing race and the stationary bearing race overlap each other with a second axial clearance;

wherein the rotary bearing race, the stationary bearing race and the plurality of ball bearings are assembled as a non-separable shell type ball bearing such that said first cylindrical portion of the rotary bearing can fixedly accommodate the piston rod of the shock absorber, the stationary bearing race can be fixed to the body of the motor vehicle and at least one of the radially outwardly extending flange and the portion of the upper plate confronting the radially outwardly extending flange is fabricated of a material having self-lubricating characteristics; and wherein the first axial clearance between the outwardly extending flange of the rotary bearing race and the upper plate of the rubber buffer mount is set smaller than the second axial clearance between the radially inwardly extending flange of the second cylindrical portion of the stationary bearing race and the radially outer end portiion of the rotary bearing race.

2. The bearing as claimed in claim 1, wherein the stationary bearing race further comprises: an annular race member having an innermost cylinder portion.

3. The bearing as claimed in claim 1, wherein the radial inner end face of the inner end part of the stationary bearing race is assembled proximate the outer surface of the first cylindrical portion of the rotary bearing race.

4. A rolling bearing for a strut-type suspension as claimed in claim 2, wherein the radial inner end face of the inner end part of said stationary bearing race is proximate the outer surface of said first cylindrical portion.

* * * * *